US008397091B2

(12) United States Patent
Wang et al.

(10) Patent No.: US 8,397,091 B2
(45) Date of Patent: Mar. 12, 2013

(54) APPARATUS AND METHOD FOR TPM AND LAN POWER MANAGEMENT

(75) Inventors: Wei Wang, San Jose, CA (US); Andrew Hwang, Redondo Beach, CA (US); Thanh Tran, Anaheim, CA (US)

(73) Assignee: Broadcom Corporation, Irvine, CA (US)

( * ) Notice: Subject to any disclaimer, the term of this patent is extended or adjusted under 35 U.S.C. 154(b) by 1942 days.

(21) Appl. No.: 11/476,846

(22) Filed: Jun. 29, 2006

(65) Prior Publication Data

US 2007/0223519 A1    Sep. 27, 2007

Related U.S. Application Data

(60) Provisional application No. 60/785,270, filed on Mar. 24, 2006.

(51) Int. Cl.
*G06F 1/32*        (2006.01)

(52) U.S. Cl. ......................................................... 713/322

(58) Field of Classification Search .................... 713/322
See application file for complete search history.

(56) References Cited

U.S. PATENT DOCUMENTS

| 6,256,320 | B1 * | 7/2001 | Tang et al. ..................... 370/462 |
| 7,181,632 | B2 * | 2/2007 | Klug et al. ..................... 713/320 |
| 7,940,934 | B2 * | 5/2011 | Buer ............................... 380/277 |
| 2007/0130472 | A1 | 6/2007 | Buer |
| 2007/0168048 | A1 | 7/2007 | Allen et al. |

* cited by examiner

*Primary Examiner* — Kim Huynh
*Assistant Examiner* — Eric Chang
(74) *Attorney, Agent, or Firm* — Sterne, Kessler, Goldstein & Fox PLLC

(57) ABSTRACT

In Gigabit Ethernet Systems, the Trusted Platform Module (TPM) is designed to provide trust and security to a platform through integrity measurement, protected storage, and other cryptographic functions. The present invention relates to a TPM-LAN chip with separate TPM and LAN power management. The TPM-LAN chip is designed such a way that power is reduced significantly in different power management modes compared to the legacy devices. This is accomplished by turning off certain clocks during certain operating modes.

7 Claims, 3 Drawing Sheets

APPARATUS AND METHOD FOR TPM AND LAN POWER MANAGEMENT

CROSS REFERENCE TO RELATED APPLICATIONS

This application claims the benefit of U.S. Provisional Application No. 60/785,270 filed Mar. 24, 2006, which is incorporated herein by reference in its entirety.

FIELD OF THE INVENTION

The present invention relates to an integrated TPM and Gigabit controller microprocessor, specifically to a microprocessor with separate TPM and LAN power management.

BACKGROUND OF THE INVENTION

A trusted platform module (TPM) is a microchip that provides hardware-based security and access management for computer system. The current TPM 1.2 security standard is created by the Trusted Computing Group (TCG). Computer systems equipped with a TPM chip are more resistant to security attack than systems protected with software. Software-based systems are often subjected to external attack because of their high dependency on the computer's operating system. In contrast, TPM-based systems use the TPM onboard chip's firmware and control logic for processing security related functions, thus making them more robust and secure by isolating the security functions from the computer operating system's software.

TPM-based systems are further superior to software-based systems because of their ability to create cryptographic keys and to store the master key needed to decrypt the encrypted code within the TPM itself. This functionality makes it very hard to attack TPM-based systems remotely. Physical security attack remains a risk, but physical access to the system is needed.

The current pace of e-commerce demands a faster and more secure network connection. Presently, Fast Ethernet such as 10BASE-T or 100BASE-T Ethernet is commonly implemented in a local area network (LAN). However, as e-commerce continues to grow, Fast Ethernet is being replaced by Gigabit Ethernet (1000BASE-T) technology Conventionally, to take advantage of both the TPM and Gigabit Ethernet technologies, a computer system is required to have both the TPM and Gigabit Controller (LAN module) chips. However, this form of solution is expensive and demands a large footprint, especially for desktop and laptop applications. Integration of the TPM chip and LAN module has been done, but disadvantages remain. Currently, a conventional TPM-LAN chip utilizes a lot of power because various functions of the TPM chip and the LAN module cannot be fully isolated. This leads to excessive power consumption as shared resources could not be shutdown.

Accordingly, what is needed is an integrated TPM-LAN chip with separate TPM and LAN power management while preserving the advantages of lower cost and smaller footprint of the integrated chip.

BRIEF DESCRIPTION OF THE DRAWINGS/FIGURES

The present invention is described with reference to the accompanying drawings.

DETAILED DESCRIPTION OF THE INVENTION

This specification discloses one or more embodiments that incorporate the features of this invention. The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art will recognize that other configurations and procedures may be used without departing from the spirit and scope of the invention.

Figure 1:
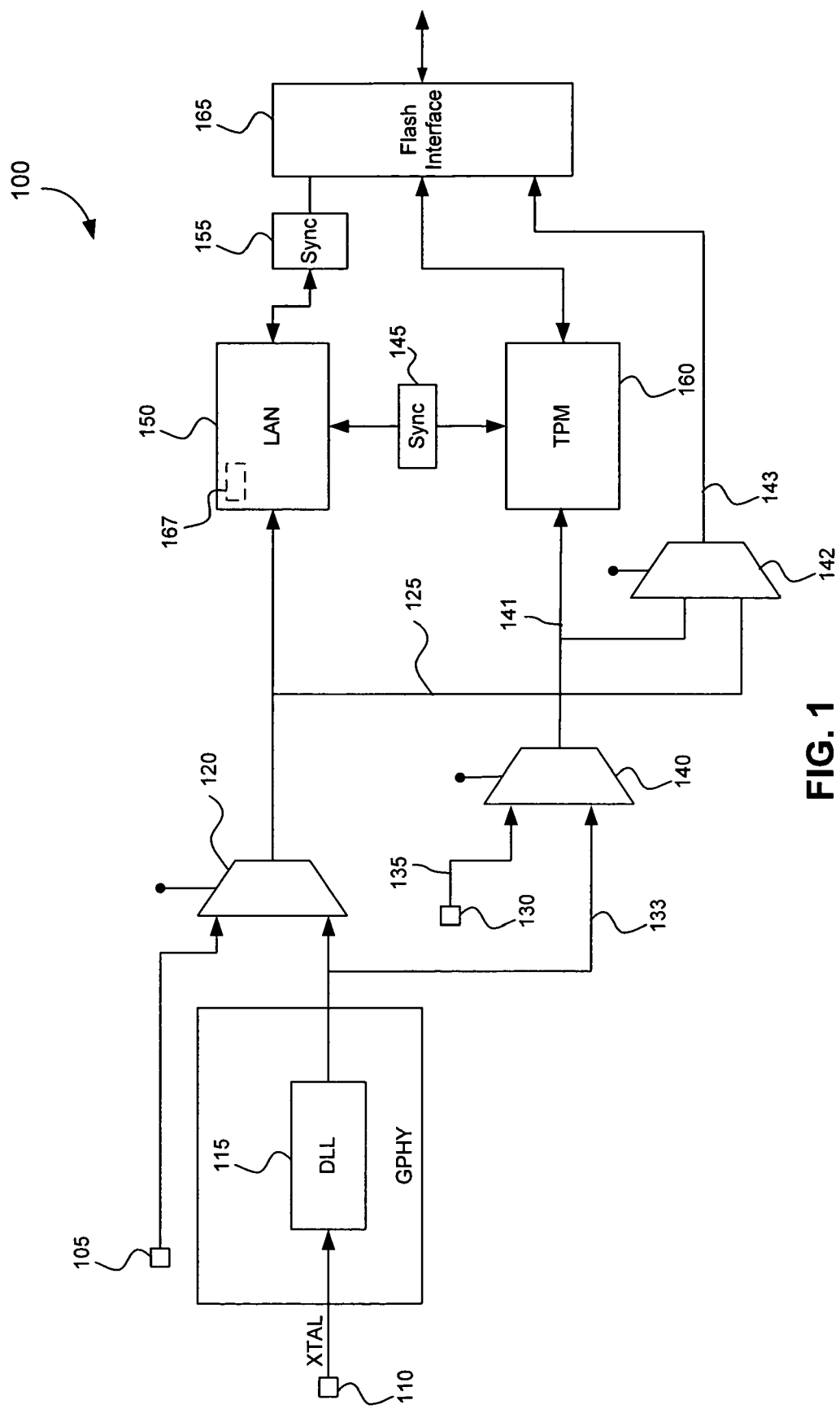
FIGS. 1-2 illustrate exemplary microprocessors according to embodiments of the present invention.

FIG. 1 illustrates a microprocessor 100 according to an embodiment of the present invention. Microprocessor 100 includes an alternate clock 105, a primary clock 110, a delay locked loop (DLL) 115, a clock selector 120, a clock 130, the 2nd clock selector 140, a local area network (LAN) module 150, a monitoring circuit 145, a trusted platform module (TPM) 160, the $3^{rd}$ clock selector 142, a flash-LAN clock synchronization circuit 155, and a flash interface 165.

Alternate clock 105 is coupled to an input of clock selector 120. Alternate clock 105 may be a crystal clock or any oscillating signal generator such as a voltage control oscillator (VCO). In an embodiment, alternate clock 105 is a dual stage clock with two possible frequency outputs, 6.25 MHz and 12.5 MHz. Clock selector 120 may be a switch or a multiplexer. Clock selector 120 has two inputs. The first input is from the output of alternate clock 105. The second input is from the output of DLL 115. Clock selector 120 is configured to output either the alternate clock's 105 signal or the DLL's 115 output signal to its output 125.

As illustrated in FIG. 1, Primary clock 110 is coupled to a DLL 115. In an embodiment, primary clock 110 produces a 25 MHz clock signal. Similar to alternate clock 105, primary clock 110 may be a crystal clock or an oscillating signal generator such as a VCO.

DLL 115 is adapted to receive the signal output of primary clock 110 and to multiply its frequency. In an embodiment, DLL 115 outputs a frequency of 62.5 MHz. DLL 115 is also adapted to provide a clock signal 133 to clock selector 140. Clock selector 140 is adapted to receive another clock signal 135 from clock 130. Clock 130 may be a crystal clock or an oscillating signal generator. In an embodiment, clock 130 is configured to output a signal frequency of 6.25 MHz.

Clock selector 140 is configured to provide a clock signal 141 to TPM 160. Clock selector 140 may be a switch or a multiplexer. In an embodiment, clock selector 140 is a two-input signal multiplexer and is configured to select clock signal 135 as an output signal 141 when TPM 160 is in an idle or inactive state. Clock selector 140 is also configured to select clock signal 133 as an output signal 141 when TPM 160 is active. In active mode, TPM 160 requires signal 141 to be a 62.5 MHz frequency signal for internal operations. In idle or inactive mode, TPM 160 requires signal 141 to be a 6.25 MHz frequency signal.

To shut down DLL 115 safely and without interfering with TPM's 160 operation, monitoring circuit 145 is coupled between LAN module 150 and TPM 160. Monitoring circuit 145 monitors the status TPM 160 and reports it to LAN module 150. Monitoring circuit 145 is configured to report to LAN module 150 whether TPM 160 is in an idle or active mode. In this way, LAN module 150 can determine whether it may shut down DLL 115. Additionally, LAN module 150 may instruct clock selector 140 to select clock 130 if TPM 160 is idle or select clock signal 133 if TPM is active. After clock 130 is switched to be the TPM's clock, monitoring circuit 145 informs TPM 160 that the switch has been completed. In this way, TPM 160 may queue its functions with clock 130. Monitoring circuit 145 also performs the same functions when microprocessor 100 is in other modes. Generally, every time the clock source for TPM 160 is switched, monitoring circuit 145 notifies TPM 160 of the switch.

For example, LAN is in power saving mode, when monitoring circuit 145 notifies LAN module 150 that TPM 160 is in an inactive state, LAN module 150 or microprocessor 100 may shut down DLL 115 and switch LAN module 150 to use alternate clock 105 instead of DLL 115. Concurrently, clock selector 140 selects clock 130 as the TPM's clock. As another example, when monitoring circuit 145 notifies LAN module 150 that TPM 160 is active, then LAN module 150 or microprocessor 100 will power up DLL 115. Concurrently, clock selector 140 is instructed to select clock signal 133 as the TPM's clock. Monitoring circuit 145 is also configured to report to TPM 160 which clock, clock 130 or 133, TPM 160 is currently set to. In this way, TPM 160 can queue up its internal timer to clock 133.

Microprocessor 100 includes flash interface 165 and flash-LAN clock synchronization circuit 155. Conventionally, flash interface 165, TPM 160, and LAN module 150 are on the same clock domain; they are coupled to the same clock. In the conventional configuration, LAN module 150 cannot slow down or shut down the LAN's clock when TPM 160 is active since a fast 62.5 MHz clock is needed. As illustrated in FIG. 1, Clock selector 142 is configured to provide a clock signal 143 to flash interface 165. Clock selector 142 may be a switch or a multiplexer. In an embodiment, clock selector 142 is a two-input signal multiplexer and is configured to select clock signal 125 as an output signal 143 when TPM is disabled. Clock selector 142 is also configured to select clock signal 141 as an output signal 143 when TPM is enabled. In this way, flash interface 165 can operate on the same clock domain as TPM 160 when TPM is enabled. In this embodiment, flash interface 165 is independent from LAN module 150; thus allowing microprocessor 100 to slow down or shut down the LAN module's 150 clock without interfering with flash interface's 165 and TPM's 160 operations. Since LAN module 150 and flash interface 165 may work in different clock domains, synchronizing circuit 155 is needed to ensure proper communication between LAN module 150 and flash interface 165.

In an embodiment, flash interface 165 is a common flash memory interface that is configured to communicate with a flash memory or an EEPROM device. The built-in manageability functions of LAN module 150 such as alert standards format (ASF) 2.0 may require external inputs such as ASF configurations and code, which may be supplied by an external EEPROM device through flash interface 165. Further, firmware image for TPM's 160 firmware may also be uploaded to TPM 160 via flash interface 165.

Further, in an embodiment, a separate random number generator 167 (RNG) is provided for LAN module 150. This allows for the independent operation of LAN module 150 and TPM 160. Conventionally, LAN module 150 uses TPM's 160 RNG. However, the conventional configuration creates dependency and prevents microprocessor 100 to shut down TPM 160's clock when TPM 160 is disabled. The separate RNG configuration allows microprocessor 100 to shut down TPM 160's clock without regard to whether LAN module 150 needs the RNG's functionality.

The operating statuses of LAN module 150 and TPM 160 generally determine their respective clock speed and the power mode of various components in microprocessor 100. To simplify the discussion of various modes of microprocessor 100, a mode number will be assigned to one of the various combinations of LAN and TPM operating status. The mode number assignment is as follows:

TABLE 1

| Mode # | LAN Status | TPM Status |
| --- | --- | --- |
| 1 | Normal | Enabled, Active |
| 2 | Normal | Enabled, Inactive |
| 3 | Normal | Disabled, Inactive |
| 4 | Power Saving | Enabled, Active |
| 5 | Power Saving | Enabled, Inactive |
| 6 | Power Saving | Disabled, Inactive |
| 7 | IDDQ/CABLESENSE | Enabled, Active |
| 8 | IDDQ/CABLESENSE | Enabled, Inactive |
| 9 | IDDQ/CABLESENSE | Disabled, Inactive |

When TPM 160 is active, its functionalities are being used and a fast clock source is needed. When TPM 160 is inactive and enabled, it is not being used but may be become active anytime. During this mode, TPM 160 operates on a slower clock. When TPM 160 is inactive and disabled, it is shutdown and a clock source is not needed. The power modes shown in Table 1 are only examples of possible power modes, microprocessor 100 may be configured to have others power modes not listed.

In mode 1, DLL 115 is selected as the clock source for both LAN 150 and TPM 160. In mode 2, LAN's 150 source clock remains as DLL 115. Further, clock selector 140 is configured to select clock 130, which operates at a slower frequency than DLL 115. In mode 3, clock 130 is shutdown and is selected as the clock source for TPM 160 by clock selector 140. In this way, power saving may be realized.

In mode 4, clock selector 120 selects clock 105 as the LAN's clock. In this mode, DLL 115 remains active because TPM 160 is in active mode. In mode 5, the following operations take place: clock 105 is selected as the LAN clock, clock 130 is enabled and selected as the TPM's clock, DLL 115 is shutdown.

In mode 6, TPM 160 does not need a clock signal; therefore, DLL 115 and clock 130 may all be turned off. In this instance, TPM 160 select clock 130 as the clock source. Meanwhile, LAN module 150 is configured to use clock 105.

In mode 7, LAN module 150 doesn't need a clock signal. Thus, clock 105 is turned off and is selected as the clock source for LAN module 150. DLL 115 remains active because TPM 160 is in active mode. Clock selector 140 selects clock signal 133 as the clock source for TPM 160.

In mode 8, clock selector 120 selects clock 105 as the LAN module 150 clock, which is configured to be off. In this manner, LAN module 150 does not receive any clock signal. This has an equivalence of gating off the output of clock selector 120 to prevent any propagation of signals to LAN module 150. Further, clock 130 is enabled and is set as the clock source for TPM 160. Since LAN module 150 no longer needs a clock source, DLL 115 is turned off.

Mode 9 is similar to mode 8, except for the operating status of clock 130. In mode 9, clock 130 is turned off and is selected as the clock source for TPM 160.

Figure 2:
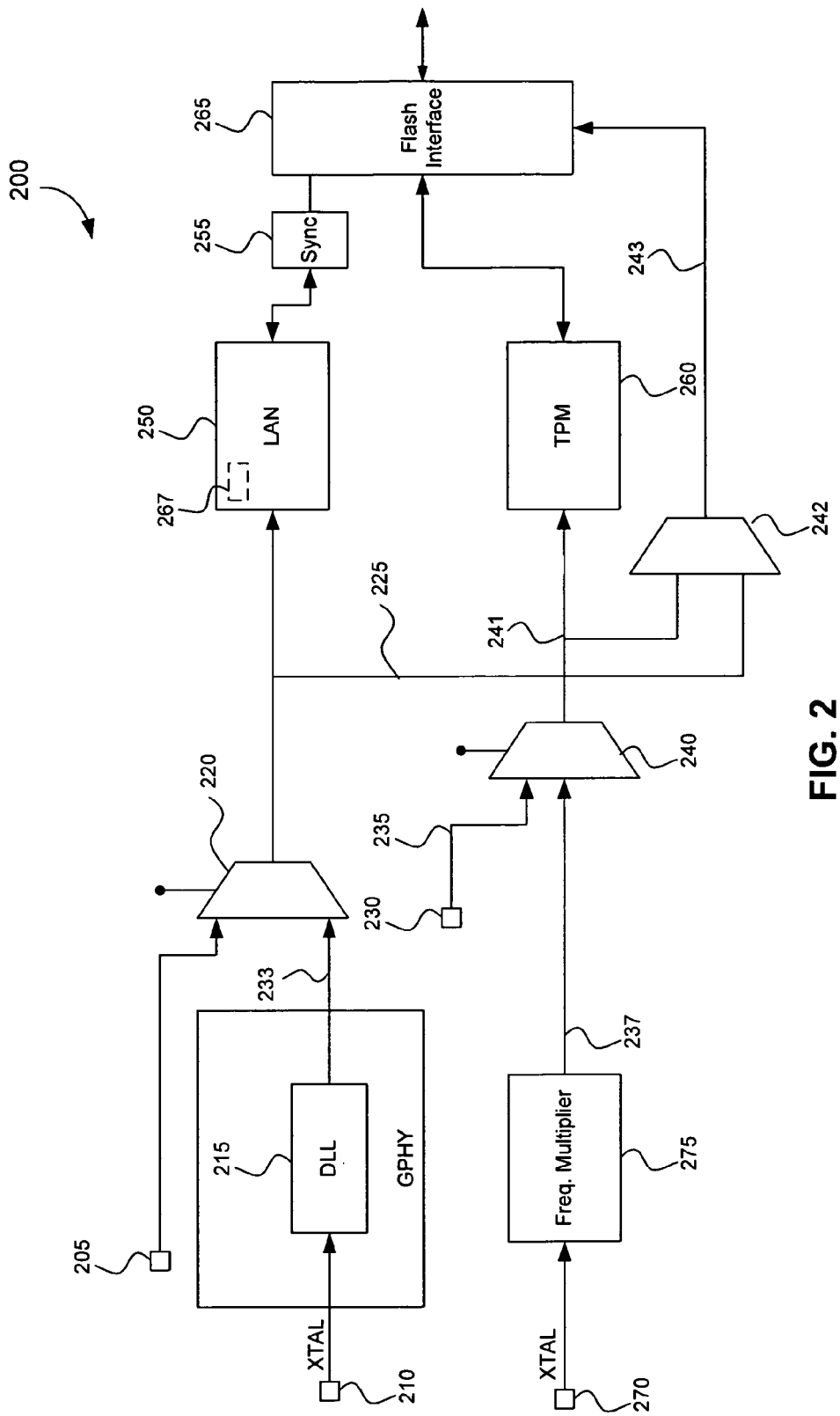

FIG. 2 illustrates a microprocessor 200 according to yet another embodiment of the present invention. Microprocessor 200 is similar to microprocessors 100, but is different to the extend that microprocessor 200 no longer needs a monitoring circuit similar to circuit 145 for operational flexibility. Microprocessor 200 includes an alternate clock 205, a primary clock 210, a delay lock loop (DLL) 215, a clock selector 220, a clock 230, a second clock selector 240, a local area network (LAN) module 250, a trusted platform module (TPM) 260, a $3^{rd}$ clock selector 242, a flash-LAN clock synchronization circuit 255, a flash interface 265, and a third clock 270.

Alternate clock 205 is coupled to an input of clock selector 220. Alternate clock 205 may be a crystal clock or any oscillating signal generator such as a voltage control oscillator (VCO). In an embodiment, alternate clock 205 is a dual-stage clock with two possible frequency outputs, 6.25 MHz and 12.5 MHz. Clock selector 220 may be switch or a multiplexer. Clock selector 220 has two inputs. The first input is from the output of alternate clock 205. The second input is from the output of DLL 215. Clock selector 220 is configured to output either the alternate clock's 205 signal or the DLL's 215 output signal. In an embodiment, clock selector 220 selects alternate clock's 205 signal for outputting to LAN module 250 in spite of the status of TPM 260. In this way, LAN module 250 switches to the alternate clock 205 and allows microprocessor 200 to shut down DLL 215 and save power when the microprocessor 200 is in power saving mode.

As illustrated in FIG. 2, primary clock 210 is coupled to DLL 215. In an embodiment, primary clock 210 produces a 25 MHz clock signal. Similar to alternate clock 205, primary clock 210 may be a crystal clock or an oscillating signal generator such as a VCO. In microprocessor 200, DLL 215 is configured to receive a signal output of primary clock 210 and to multiply the received signal's frequency. In an embodiment, DLL 215 multiplies the received signal from 25 MHz to 62.5 MHz. However, unlike in microprocessor 100, DLL's signal output 233 is not configured as one of the clock signal inputs to TPM 260. Instead, TPM 260 is configured to receive a 62.5 MHz frequency signal from frequency multiplier 275. In this configuration, TPM 260 is completely independent from DLL 215. In this way, microprocessor 200 may shut down DLL 215 at any time without concern for TPM's 260 operating status. For example, when microprocessor 200 is in power saving mode, it may shut down DLL 215 regardless of whether TPM 260 is active or inactive.

Frequency multiplier 275 is configured to receive a clock signal from clock 270 and to multiply the receive signal's frequency to a desired frequency value. In an embodiment, clock 270 outputs a signal frequency of 25 MHz, which is then multiplied by frequency multiplier 275 to produce signal 237 having a frequency of 62.5 MHz. Similar to clock 210, clock 270 may be a crystal clock or an oscillator.

Depending upon the status of TPM 260, clock selector 240 either selects signal 235 from clock 230 or signal 237 from frequency multiplier 275. Clock 230 may be a crystal clock or an oscillating signal generator. In an embodiment, clock 230 is configured to output a signal frequency of 6.25 MHz. When TPM 260 is active, clock selector 240 selects signal 237 for outputting as signal 241. When TPM 260 is in an idle or inactive state, clock selector 240 selects signal 235 for outputting as signal clock 241. In active mode, TPM 260 requires signal 241 to be a 62.5 MHz frequency signal for internal operations. In idle or inactive mode, TPM 260 requires signal 241 to be a 6.25 MHz frequency signal. In certain power modes such as mode 9, clocks 205, DLL 215, clocks 230 and 270 may be turned off. In an embodiment, clock 230 is turned off and selected as the TPM's clock. Concurrently, clock 205 is also turned off and selected as the LAN's clock. In this manner, LAN 250 and TPM 260 are in the lowest power mode.

Conventionally, flash interface 265, TPM 260, and LAN module 250 are on the same clock domain. In this configuration, LAN module 250 cannot slow down or shut down the LAN clock when TPM 260 is active. As illustrated in FIG. 2, Clock selector 242 is configured to provide a clock signal 243 to flash interface 265. Clock selector 242 may be a switch or a multiplexer. In an embodiment, clock selector 242 is a two-input signal multiplexer and is configured to select clock signal 225 as an output signal 243 when TPM is disabled. Clock selector 242 is also configured to select clock signal 241 as an output signal 243 when TPM is enabled. In this way, flash interface 265 can operate on the same clock domain as TPM 260 when TPM is enabled. In this configuration, flash interface 265 is independent from LAN module 250; thus allowing microprocessor 200 to slow down or shut down the LAN module's 250 clock without interfering with flash interface's 265 and TPM's 260 operations. In an embodiment, flash interface 265 is a common flash memory interface, a well known standard by those skilled in the art.

To ensure synchronous operation between LAN module 250 and flash interface 265, clock synchronization circuit 255 is coupled there between. Circuit 255 performs the same functions as synchronizing circuit 155 in microprocessor 100. Further, in an embodiment, a separate random number generator 267 (RNG) is provided for LAN module 250. RNG 267 serves the same function and purpose as RNG 167 in microprocessor 100.

By way of examples, the functional behaviors of various components in microprocessor 200 will now be described. In mode 1, LAN module 250 is set to use DLL 215 as the source clock. Clock selector 240 selects clock signal 237 as the source clock for TPM 260.

In mode 2, DLL 215 is configured as LAN's module 250 clock; clock 230 is enabled and is set as TPM's 260 clock. In mode 3, DLL 215 is set as the clock source for LAN module 250. Concurrently, clock 230 is shut off and set as the source for TPM 260.

In mode 4, clock 205 is enabled and selected as the clock source for LAN module 250. DLL 215 is shut down. Clock selector 240 selects clock signal 237 as the clock source for TPM 260.

In mode 5, the following configuration is used: LAN module 250 uses clock 205 as the clock source. DLL 215 is shut down; clock 230 is enabled and selected as the clock source for TPM 260.

In mode 6, TPM 260 does not need a clock signal; therefore, DLL 215, clock 270, and clock 230 may all be turned off. In this instance, TPM 260 may select either clocks 230 or 270 as the clock source, since both are off. Meanwhile, LAN module 250 is configured to use clock 205.

In mode 7, LAN module 250 doesn't need a clock signal. Thus, clock 205 is turned off and is selected as the clock source for LAN module 250. DLL 215 is shut down. Clock selector 240 selects clock signal 237 as the clock source for TPM 260.

In mode 8, clock selector 220 selects clock 205 as the LAN module 250 clock, which is configured to be off. In this manner, LAN module 250 does not receive any clock signal.

This has an equivalence of gating off the output of clock selector 220 to prevent any propagation of signals to LAN module 250. Further, clock 230 is enabled and is set as the clock source for TPM 260. Since LAN module 250 no longer needs a clock source, DLL 215 is turned off.

Mode 9 is similar to mode 8, except for the operating status of clock 230. In mode 9, clock 230 is turned off and is selected as the clock source for TPM 260.

Various power saving modes and power savings will now be described for microprocessor 100. Microprocessor's 100 power saving modes depend on the power modes of the LAN module 150. It should be understood that the various power modes discussed below may also be implemented on microprocessors 200.

TABLE 2

| Power Saving Mode | TPM - Idle | TPM - Active |
|---|---|---|
| IDDQ | 258 mW | 138 mW |
| CableSense | 176 mW | 56 mW |
| Conference Room | 178 mW | 130 mW |
| Airplane | 250 mW | 130 mW |
| D0u | 388 mW | 268 mW |
| D3Hot/D3Cold with WOL = 1 or ASF | 261 mW | 213 mW |
| D3Hot/D3Cold with WOL = 0 and no ASF | 341 mW | 221 mW |
| TPM is disabled and LAN is active | 60 mW | |

When microprocessor 100 is in IDDQ power saving mode, LAN module's 150 may operate without a clock signal. In this way, both of the DLL 115 and alternative clock 105 may be shut down. During IDDQ mode, a power saving of 258 mW may be realized when TPM 160 is in an idle state. During the idle state, TPM 160 is operating from slow clock 130. When TPM is active during IDDQ mode, a power saving of 138 mW may be realized. In this mode, DLL 115 must be active because a 62.5 MHz clock signal is needed by TPM 160. In this instance, even though both of the DLL 115 and TPM 160 are active, power saving can still be realized because other portions of microprocessor 100 (e.g. the rest of the Gigabit Ethernet transceiver circuits) may be shutdown or put in idle state.

In the CableSense mode, a maximum and minimum power saving of 176 mW and 56 mW may be achieved, respectively. CableSense mode is very similar to IDDQ. The main difference between the two modes is the signal detection circuit (not shown) which is constantly on in CableSense mode. In IDDQ mode, the signal detection circuit is off. In CableSense mode, when TPM 160 is in an idle state, DLL 115 may be shut down. In this instance, TPM 160 operates on slow clock 130. When TPM is active, DLL 115 must be active to provide clock signal 133 to clock selector 140 and TPM 160. Further, in CableSense mode, LAN module 150 may operate without a clock signal. In this way, alternative clock 105 and most of the Gigabit Ethernet transceiver circuits may be shut down.

In the Conference Room mode, a power saving of 178 mW may be realized when TPM 160 is in an idle state. During the idle state, TPM 160 is operating from slow clock 130. When TPM is active during the Conference Room mode, a power saving of 130 mW may be realized. In active mode, TPM 160 operates on a 62.5 MHz signal from DLL 115. Again, power saving is realized even when DLL is active because LAN module 150 can operate in a slow clock from 105.

In the "D3Hot/D3Cold with WOL=1 or ASF" (D3) mode, a maximum and minimum power saving of 261 and 231 mW, respectively, may be realized. The D3 mode utilizes both the functionalities of the IDDQ and Conference Room modes. Further, in D3 mode, the ethernet speed is slow down from gigabit speed to Fast Ethernet speed of 10/100 Mbits. In this way, further power saving is realized. The "D3Hot/D3Cold with WOL=0, no ASF" mode operates in similar fashion with the D3 mode, but with maximum and minimum power saving of 341 mW and 221 mW, respectively.

Even in non-power saving mode, the circuit layout and clock management scheme of microprocessor 100 allows for a power saving of approximately 60 mW when TPM 160 is disabled. Although certain power saving modes are described for microprocessor 100, other power saving modes may also be implemented as would be understood by one skilled in the art.

Figure 3:
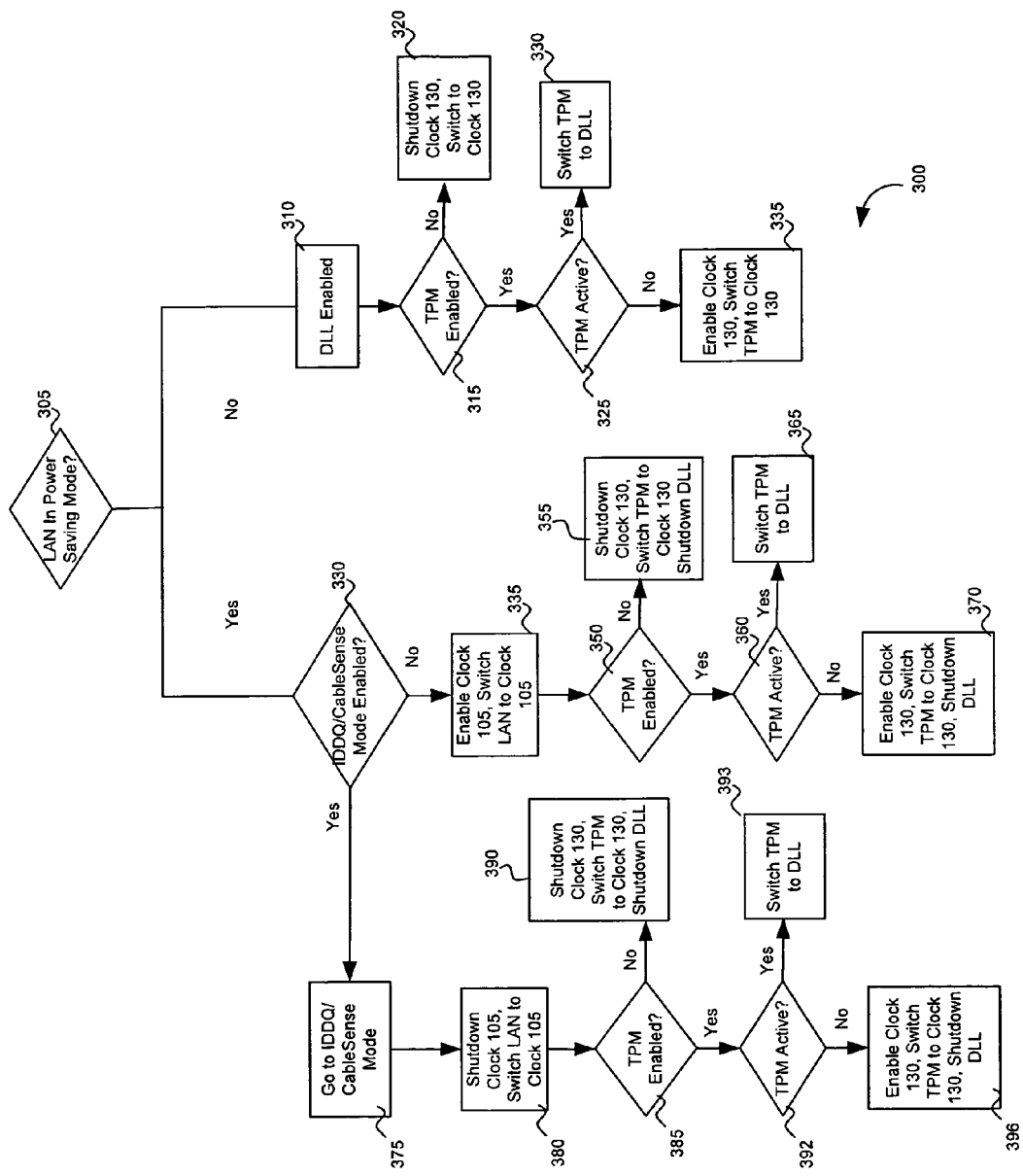
FIG. 3 illustrates exemplary operational flow charts according to embodiments of the present invention.

FIG. 3 illustrates an example operation 300 flow for microprocessor 100. In step 305, whether microprocessor 100 is in power saving mode is determined. If microprocessor 100 is in a non-power saving mode, then step 310 is invoked. In step 315, a determination is made on whether TPM 160 is enabled. If TPM 160 is not enabled, clock 130 is shutdown and selected as the TPM's clock. In this way, TPM 160 receives no clock signal. If TPM 160 is enabled, then a determination is made on whether TPM 160 is active in step 325. In step 330, when TPM 160 is active, clock selector 140 selects clock signal 133 from DLL 115 as the TPM's clock. If TPM 160 is inactive, clock 130 is switched on and selected as the TPM's clock in step 335.

If microprocessor 100 is in a power saving mode, then step 330 is executed. In step 330, it is determined whether microprocessor 100 is in a special power saving mode such as Airplane or IDDQ mode. If not, step 335 is invoked. In step 335, clock 105 is enabled and selected as LAN's 150 clock. The next step is step 350, which determines whether TPM 160 is enabled. If no, clock 130 is turned off and selected as TPM's 160 clock, DLL 115 is also turned off. If yes, in step 360, it is determined whether TPM 160 is active. If TPM is active, DLL 115 is selected as TPM's 160 clock in step 365. If TPM is not active, clock 130 is enabled and selected as TPM's 160 clock and DLL 115 is shutdown in step 370.

At step 375, microprocessor 100 is configured to go into IDDQ/CableSense mode. At step 380, clock 105 is turned off and selected as LAN's 150 clock. In this manner, LAN 150 receives no clock signals. This is equivalent to gating off clock selector 120 or disabling it as a whole. In step 385, a determination is made on whether TPM 160 is enabled. If TPM is not enabled, clock 130 is turned off and is selected as the TPM's clock in step 390. Additionally, DLL 115 is turned off. If TPM is enabled, step 392 is invoked to determine whether TPM 160 is active or inactive. If TPM is active, TPM's 160 clock is switched to DLL 115 in step 393. If TPM 160 is not active, clock 130 is turned on and is selected as the TPM's clock in step 396. Further, DLL 115 is turned off at this step. Even though microprocessors 100 is operatively described using operation flow chart 300, other process flow could also be implemented as would be understood by one skilled in the art.

CONCLUSION

While various embodiments of the present invention have been described above, it should be understood that they have been presented by way of example only, and not limitation. It will be apparent to persons skilled in the relevant art that various changes in form and detail may be made therein without departing from the spirit and scope of the invention. Thus, the breadth and scope of the present invention should not be limited by any of the above-described exemplary embodiments, but should be defined only in accordance with the following claims and their equivalents.

We claim:

1. A system for managing power of a local area network module (LAN) and a trusted platform module (TPM), the LAN module coupled to a primary and an alternate clock, the system comprising:
   a first clock;
   a state monitor coupled to the TPM and the LAN for reporting a TPM information to the LAN, wherein the LAN is configured to receive either the primary or the alternate clock based on the reported TPM information; and
   a first clock selector having a first input, a second input, and an output coupled to the TPM, the first and second input is coupled to the primary and the first clock, respectively, wherein the first clock selector outputs either the primary or the first clock based on the TPM information.

2. The system of claim 1, wherein the first clock operates at a slower frequency than the primary clock.

3. The system of claim 1, wherein the primary clock operates at 62.5 MHz.

4. The system of claim 1 further comprising:
   a flash interface coupled to the TPM.

5. The system of claim 4, further comprising:
   a second state monitor coupled to the LAN and the flash interface for reporting LAN information to the flash interface and flash interface information to the LAN.

6. The system of claim 1, wherein the TPM information comprises operating status information such as idle or active.

7. The system of claim 4, further comprising:
   a second clock selector having a first input coupled the primary clock, a second input coupled to the alternate clock, and an output coupled to the LAN; and
   a third clock selector having a first input coupled to output of the second clock selector and a second input coupled to the output of the first clock selector.

* * * * *

UNITED STATES PATENT AND TRADEMARK OFFICE
CERTIFICATE OF CORRECTION

| | |
|---|---|
| PATENT NO. | : 8,397,091 B2 |
| APPLICATION NO. | : 11/476846 |
| DATED | : March 12, 2013 |
| INVENTOR(S) | : Wang et al. |

It is certified that error appears in the above-identified patent and that said Letters Patent is hereby corrected as shown below:

In the Claims

At Column 10, Line 12, Claim 7, please replace "coupled the" with -- coupled to the --.

At Column 10, Line 15, Claim 7, please replace "coupled to output" with -- coupled to the output --.

Signed and Sealed this
Nineteenth Day of November, 2013

Teresa Stanek Rea
*Deputy Director of the United States Patent and Trademark Office*